July 26, 1938.    H. WOLLNER    2,124,803
UNIVERSAL JOINT
Original Filed May 15, 1935    2 Sheets-Sheet 1
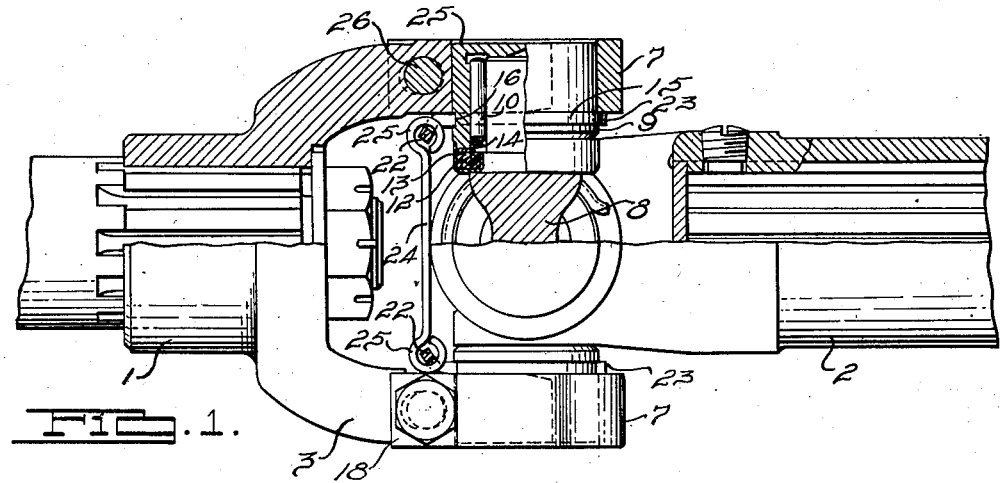
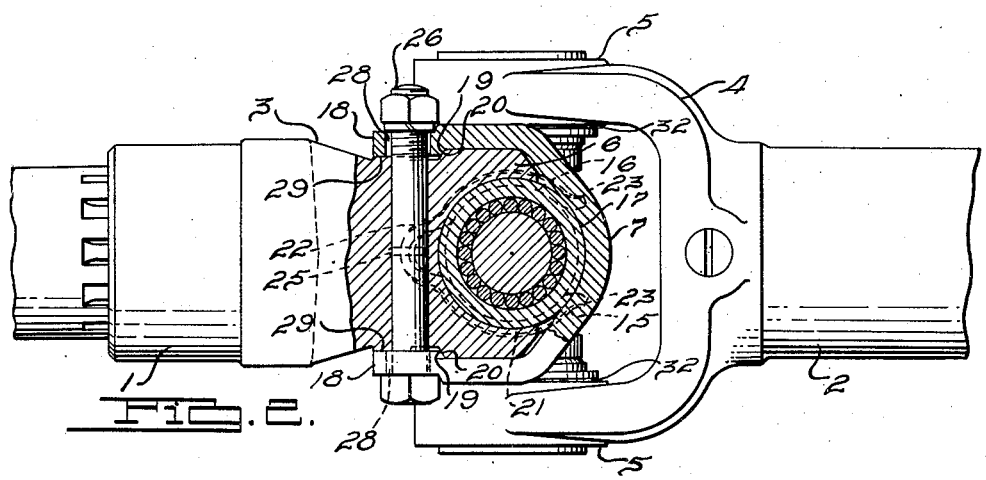
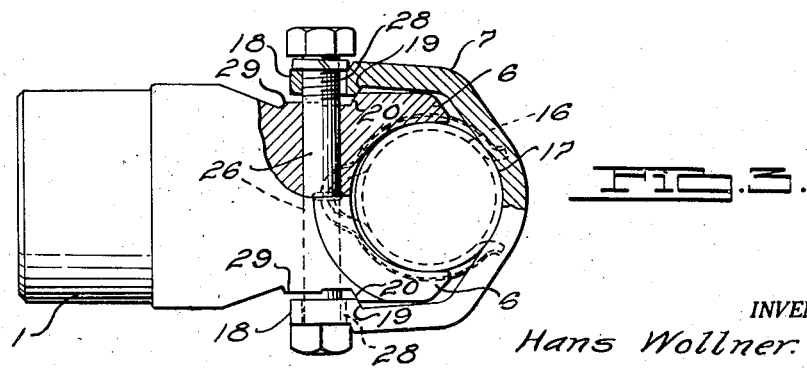
INVENTOR.
Hans Wollner.
BY
Harness, Dickey, Pierce & Hann.
ATTORNEYS.

July 26, 1938.   H. WOLLNER   2,124,803
UNIVERSAL JOINT
Original Filed May 15, 1935   2 Sheets-Sheet 2

INVENTOR.
Hans Wollner.
BY Harness, Dickey, Pierce & Hann.
ATTORNEYS.

Patented July 26, 1938

2,124,803

UNITED STATES PATENT OFFICE 2,124,803

UNIVERSAL JOINT

Hans Wollner, Detroit, Mich., assignor to Universal Products Company, Inc., a corporation of Delaware Application May 15, 1935, Serial No. 21,515
Renewed April 15, 1936

16 Claims. (Cl. 64—17)

The present invention relates to universal joints for coupling together sections of shafting and particularly to a construction embodying demountable journals.

It is an object of the present invention to provide a universal joint in which the journals associated with either or both of two related sections of shafting are readily demountable.

It is also an object of the present invention to provide a universal joint having demountable journals, in which the securing together of the demountable parts automatically tightens the journals.

It is also an object of the present invention to provide a universal joint having demountable members, in which the securing together of the demountable parts automatically seals the bearing assemblies associated with the joints.

It is also an object of the present invention to provide a universal joint construction of the demountable type, and embodying means to conveniently retain the bearing housings in position pending complete assembly of the joint.

It is also an object of the present invention to provide a universal joint of the demountable type in which the demountable members may be loosely connected together and thereafter assembled on the joint without separating them.

It is also an object of the present invention to provide a universal joint construction embodying a clamping bar to secure a shaft to the joint, and having cam members for cooperation with the shaft to thereby provide a tightening effect.

It is also an object of the present invention to provide a universal joint of the type in which locking rings are employed to retain the bearing housings in position, and in which pending complete assembly of the parts, related pairs of bearing housings may be retained in place by a connecting link between the associated locking rings.

Other objects and advantages of the present invention appear in the following description and in the appended claims.

In the drawings:

Fig. 1 is a view in elevation, partly in section, of a universal joint embodying the present invention.

Fig. 2 is a top plan view, partly in section, of the elements shown in Fig. 1.

Fig. 3 is an assembly view, partly in section, of a part of a universal joint embodying the present invention.

Figure 4:
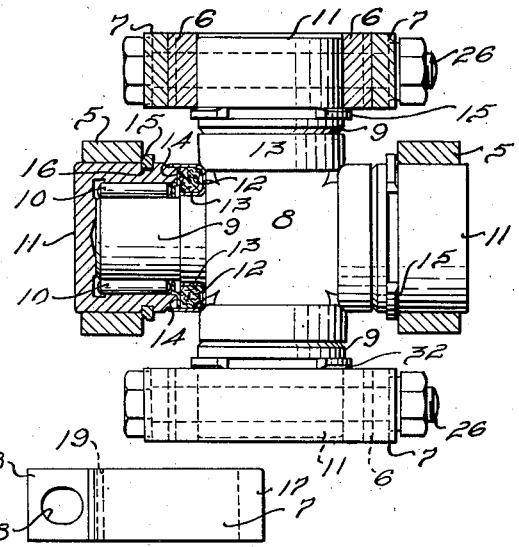
Fig. 4 is a view of a connecting cross which may be used in the practice of the present invention.

Universal joint mechanism, in general, comprises a central connecting member, frequently called a "cross", and formed with trunnions to which the separate sections of shafting are respectively rotatably mounted. It has become customary to provide completely enclosed bearings for the trunnions just mentioned, so that lubricant is applied only at the time of initial assembly. To reduce the number of parts involved in a complete joint assembly, it has been found desirable, particularly in the automobile industry, to assemble one or both of the shaft sections with its cooperating trunnions in the general automobile assembly line, rather than to initially assemble a complete joint and thereafter attach the shafting thereto.

With the universal joint constructions of which the present applicant is aware, the last mentioned assembly practice renders it difficult to economically produce a universal joint which is positive in operation, and in which the bearing housings are sealed with sufficient tightness to eliminate the loss of lubricant.

In accordance with the present invention, the journals associated with at least one of the two cooperating shafts are demountable, and comprise a member formed at the end of such shaft, and a cooperating somewhat flexible clamping bar arranged to be bolted thereto to complete the journal. The construction of the clamping bar and cooperating member is preferably such that as the bolts are tightened, the journal area is correspondingly reduced, thus providing for the desired tightness in a simple manner. The construction may be such that in the course of the assembly, the bearing housings are automatically tightly sealed, permitting the use of relatively simple bearing housings. In accordance with one illustrated embodiment, the yokes and cooperating clamping bars may be loosely connected together and thereafter fitted to the cooperating bearing housings, by swinging the clamping bar around the housing.

In accordance with the present invention also, the assembly preferably includes a member which may be used to retain the bearing housings in assembled relation on the "cross" pending the application of the associated shaft section. As illustrated, this member comprises a link formed to engage locking rings associated with the bearing housings.

Referring to Figs. 1, 2 and 3, the illustrated embodiment of the present invention comprises shafts 1 and 2 suitably splined to cooperating shafts, and provided at their ends with bifurcated yokes 3 and 4 respectively. The ends of yoke 3 terminate in semi-circularly formed members 6, which, in accordance with the present invention, are arranged to cooperate with U-shaped clamping bars such as 7, to form a demountable journal. The ends of yoke 4 are illustrated as terminating in conventional journals 5, although the construction used in connection with yoke 3 may be used.

Yokes 3 and 4 are connected together through a cross member which may take the form illustrated in Fig. 4 and designated 8. Referring to Fig. 4, cross 8 comprises four radially disposed trunnions 9 each of which is provided with a roller bearing assembly comprising roller bearings 10, bearing cups 11, packing rings 12 and retaining rings 13 and 14. It will be understood that each retaining ring 13, formed as a circular groove, is tightly fitted over the cooperating trunnion 9. Each packing ring 12 preferably fits somewhat tightly within the cooperating ring 13. The retaining rings 14 may thereafter be placed over the packing rings 12, and preferably cover substantially the entire surface thereof.

As illustrated, members 5 are pressed upon their associated bearing cups 11 and engage locking rings 15. Rings 15, which are described in more detail below, are fitted into annular recesses 16 formed in bearing cups 11 to hold the cups against outward movement with repsect to the members 5. The thrust bearing provided by the engagement between bearing cups 11 and the end of trunnion 9 serve to center cross 8 with respect to journals 5. The retaining rings 14 are pressed into the open end of the cups and the cups and rings 14 are held firmly against the packing 12 to form a dust and lubrication seal.

As best shown in Fig. 2, the semi-circular portions 6 associated with yoke 3 partially surround the associated bearing cups 11. The clamping bars 7 comprise central sections 17, formed to fit bearing cups 11, and end sections 18. Each end section 18 is provided with a sloping off-set 19 disposed to engage and ride upon a cooperating off-set 20 formed in member 6. The clamps 7 are preferably of pressed metal and provide a flexible member which may be accurately dimensioned, and economically manufactured.

The locking rings 15 associated with the bearing cups 11 which correspond to yoke 3 are formed with intermediate curved portions 21 having substantially the curvature of bearing cups 11, and a cooperating outwardly struck central portion 22. The ends 23 are somewhat relieved to facilitate the snapping of rings 15 into the recesses 16 formed in bearing cups 11. It may be noted that in Figs. 5, 6 and 7, and on the lower trunnion of Fig. 1, the front half of the rings 16 are shown broken away to more clearly show the groove 15. A connecting link 24, formed with circular end sections 25 through which rings 15 pass, serves to somewhat loosely retain bearing cups 11 in position with respect to their associated trunnions 9 pending the complete assembly of the parts. With this arrangement, it will be observed, one assembly operation may include, for example, the assembly of shaft 2 and yoke 4 with cross 8, and the positioning of the remaining two bearing cups 11 on cross 8. The link 24 retains the last mentioned cups in place until the next assembly operation. The locking rings associated with yoke 4 may be similarly formed, the details not being shown in order to simplify the drawings.

Figure 5:
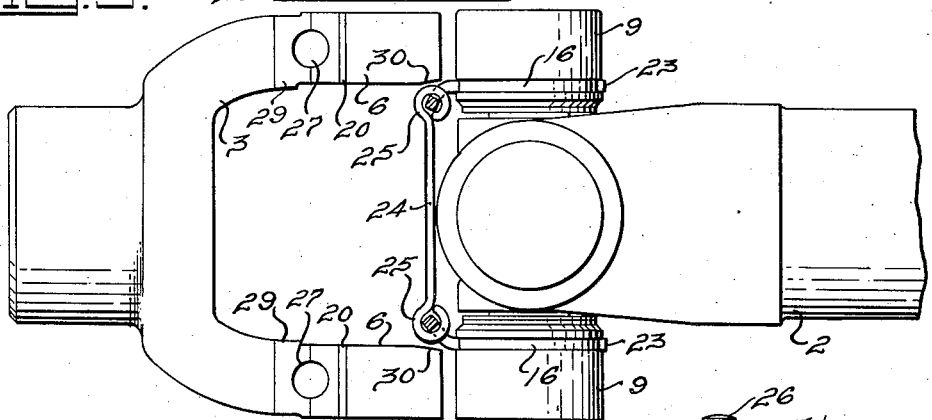
Fig. 5 is an exploded view showing the manner in which a universal joint embodying the present invention may be assembled.

In assembling shaft 1 and yoke 3 with the remaining parts of the universal joint, members 6 are placed adjacent their associated trunnions 9, as shown in Figs. 2, 3 and 5. The journal is completed by bolting clamps 7 to members 6 by bolts 26, which pass through openings 27 formed in member 6 and through somewhat enlarged openings 28 formed in end sections 18 of clamp 7. As bolts 26 are tightened, shoulders 19 ride down upon shoulders 20, drawing clamp 7 to the left in Fig. 3 and in Fig. 5, into firm engagement with the cups 11. Preferably, although not necessarily, the cooperating surfaces 19 and 20 are formed with sufficient accuracy so that when the parts occupy the position shown in Fig. 2, with section 18 bearing directly upon the cooperating shoulders 29 of member 6, the junction between clamp 7, member 6 and cups 11 is of the required tightness.

As described above in connection with yoke 4, proper spacing of cross 8 with respect to yoke 3 is maintained by means of rings 15 and the thrust provided by the engagement of the cooperating bearing cups and trunnion ends.

Referring particularly to Fig. 5, the present invention also comprises an improved method of forcing bearing cups 11 tightly into engagement with the associated packing rings 12. The outer ends of member 6 are chamfered, as at 30, to form cam-like surfaces, and a corresponding chamfer 32 is provided on the outer exterior surfaces of rings 15. When members 6 are moved adjacent the associated bearing cups 11, cam surfaces 30 first engage locking ring surfaces 32. As the movement continues, locking rings 15 and bearing cups 11 are forced inwardly on their associated trunnions and compressing packing rings 12. As will be understood, the circular end sections 25 of connecting link 24 are sufficiently large to permit this inward movement of bearing cups 11.

In accordance with the embodiments of the present invention thus far described, bolts 26 are inserted after the clamps 7 are fitted in place. In accordance with the modifications shown in Figs. 6, 7 and 8, the parts associated with shaft 1 and comprising yoke 3, clamp 7, and bolts 26 may be loosely assembled, and thereafter fitted to cross 8 without removing bolts 26.

Figures 6, 8:
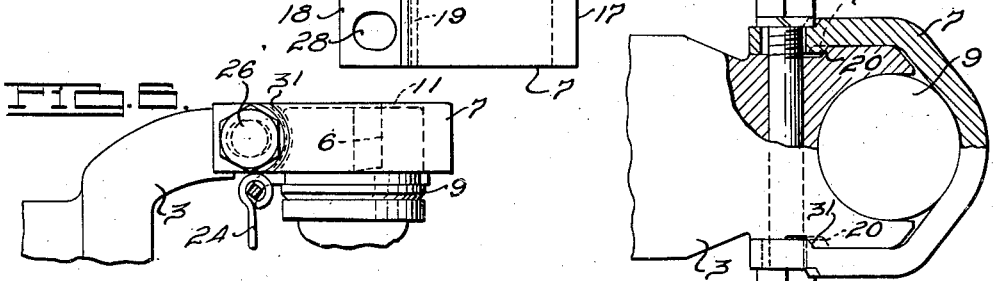
Figs. 6, 7 and 8 are views of a modified form of clamping bar which may be used in the practice of the present invention.
Figure 7:
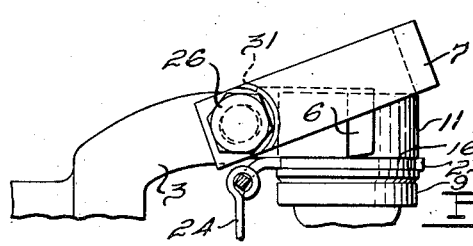

Referring to Figs. 6, 7 and 8, the surfaces 31, which engage shoulders 20 formed in member 6, are formed as the arc of a circle substantially concentric with the axis of the bolt opening in member 6.

With this latter arrangement and because of the sloping character of the shoulders 31, a clamp 7 may be swung around an associated bearing cup 11 as shown in Fig. 7, to occupy the assembled position shown in Fig. 6. When bolt 26 is tightened as previously described, clamp 7 is pulled tightly against bearing cup 11, locking the assembly in position.

Although a specific embodiment of the present invention has been shown and described, numerous modifications may be made without departing from the spirit and scope of the present invention. Accordingly, the described embodiment is to be considered in an illustrative and not in a limiting sense.

What is claimed is:

1. Mechanism for journaling a trunnion of a universal joint comprising a torque transmitting member formed to partially surround said shaft, and having a camlike shoulder formed on one side and a bolt opening normal to the axis of said shaft; a clamp for clamping said torque transmitting member in position with respect to said shaft, and having leg sections which overlap said torque transmitting member, each of said leg sections having a bolt opening and one of said leg sections having a camlike shoulder for cooperating with said first mentioned shoulder, and a bolt passed through said torque transmitting member and leg section openings to join said clamp and torque transmitting member and cause said clamp to ride down upon said first mentioned shoulder and tighten said journal.

2. Mechanism for journaling a trunnion of a universal joint comprising a torque transmitting member formed to partially surround said shaft, and having a cam-like shoulder formed on one side and a bolt opening normal to the axis of said shaft; a clamp for clamping said torque transmitting member in position with respect to said shaft, and having leg sections which overlap said torque transmitting member, each of said leg sections having a bolt opening and one of said leg sections having a cam-like shoulder formed as the arc of a circle substantially concentric with said opening for cooperating with said first mentioned shoulder, and a bolt passed through said torque transmitting member and leg section openings to join said clamp and torque transmitting member and cause said clamp shoulder to ride down upon said first mentioned shoulder and tighten said journal.

3. A universal joint comprising a member having a pair of oppositely directed trunnions, bearing cups positioned on said trunnions, packing means on said trunnions adjacent the inner edges of said cups, means providing an outwardly facing abutment on said cups, and a yoke having spaced arms adapted to receive said bearing cups respectively, said arms being bifurcated at their ends to receive said cups by movement of the cups transversely to the axis thereof, and cam means on said arms adapted to engage said outwardly facing shoulders on the cups as the joint is assembled and force the cups inwardly into engagement with the packing.

4. A universal joint including a member having a pair of radially extending oppositely disposed trunnions, bearing members on said trunnions, a torque transmitting element having recessed portions each adapted to engage and partially surround one of said bearing members, said recesses opening in the direction of the axis of said joint, and U-shaped means adapted to surround the exposed portions of said bearing members with the legs thereof overlapping said recessed portions at opposite sides, and bolts extending transversely of the axes of the joint and the trunnions through the recessed portions and the legs of the U-shaped members to secure the same together, said legs of the U-shaped members and said recessed portions having cooperating cam surfaces adapted to increase the degree of overlapping when the bolt is tightened.

5. A universal joint including a member having a pair of radially extending oppositely disposed trunnions, bearing members on said trunnions, a torque transmitting element having recessed portions opening in the direction of the axis of the joint and adapted to receive and partially surround the respective bearing members, a pair of integral U-shaped members each having spaced parallel legs adapted to embrace one of the bearing members and to extend beyond said bearing members in a direction opposite to the direction in which said recessed portions open, and means cooperating with the extremities of said legs including a pair of cooperating inclined planes for clamping said U-shaped members tightly against said bearing members.

6. A universal joint including a member having a pair of radially extending oppositely disposed trunnions, bearing members on said trunnions, a torque transmitting element having recessed portions opening in the direction of the axis of the joint and adapted to receive and partially surround the respective bearing members, said portions being provided with shoulders facing in the opposite direction from that in which the recesses open, a pair of integral U-shaped members each having spaced parallel legs adapted to embrace one of the bearing members and to extend entirely beyond said bearing member in said opposite direction into proximity to said shoulders, and means cooperating with the extremities of said legs and said shoulders for drawing said U-shaped members tightly against said bearing members in said opposite direction.

7. In a universal joint, a pair of yoke members, a member having four radially extending trunnions, two of said trunnions being journaled in the arms of one of said yoke members, bearing cups on the other two trunnions, the ends of the arms of the other yoke member having recesses opening in a direction parallel to the axis of the joint for receiving and embracing the other two trunnions and the cups thereon, the open sides of said recesses being of transverse width sufficient to receive said cups axially of the joint, and means retaining said cups in said recesses comprising a retaining element for each cup having a portion engaging the exposed side of said cup for holding it in the recess and an integral attaching portion out of contact with the sides of the cup and projecting axially of the joint from said first portion in the opposite direction to that in which said recesses open substantially beyond the transverse center plane of the joint, and means on said attaching portion and located entirely beyond the exposed side of the cup in said opposite direction for securing said retaining element in engagement with said cup, said last named means including a rotatable threaded nut cooperating with said element and said yoke on rotation to draw the element in said opposite direction against the exposed side of the cup and adapted to hold the same in clamped condition.

8. In a universal joint, a pair of yoke members, a member having four radially extending trunnions, two of said trunnions being journaled in the arms of one of said yoke members, bearing cups on the other two trunnions, the ends of the arms of the other yoke member having recesses opening in a direction parallel to the axis of the joint, the other two trunnions and the cups thereon being disposed in said recesses, the open sides of said recesses being of transverse width sufficient to receive said cups axially of the joint, and means for retaining said cups in said recesses comprising a U-shaped clamp for each cup having its intermediate portion embracing the exposed side of the cup and having substantially parallel leg portions extending on opposite sides of the cup entirely beyond the cup in a direction opposite that in which said recesses open, and means on the extremities of said legs and located entirely beyond the cup in said opposite direction for securing said clamp in engagement with said cup, said last named means including a rotatable threaded nut cooperating with said clamp and said yoke on rotation to draw the U-shaped clamp in said opposite direction against the exposed side of the cup and adapted to hold the same in clamped condition.

9. A universal joint including a member having a pair of radially extending oppositely disposed trunnions, a bearing member on each trunnion, a torque transmitting element having recessed portions each adapted to engage and partially surround one of said bearing members, a retaining element for each bearing member having a portion adapted to engage the bearing member and retain it in said opening, and a portion overlapping said torque transmitting element, means for securing each of said retaining elements to said torque transmitting element, and cooperating cam surfaces on said torque transmitting element and said overlapping portion of said retaining element adapted to cause said retaining element to draw said bearing member tightly into said recess when said elements are secured together by said means.

10. A universal joint including a member having a pair of radially extending oppositely disposed trunnions, a bearing member on each trunnion, a torque transmitting element having recessed portions each adapted to engage and partially surround one of said bearing members, a retaining element for each bearing member having a portion adapted to engage the bearing member and retain it in said opening, and an apertured portion overlapping said torque transmitting element, means for securing each of said retaining elements to said torque transmitting element comprising a threaded element extending through said apertured portion of the retaining element, and cooperating cam surfaces on said torque transmitting element and said overlapping portion of said retaining element adapted to cause said retaining element to draw said bearing member tightly into said recess when said threaded element is tightened.

11. A universal joint including a member having a pair of radially extending oppositely disposed trunnions, bearing members on said trunnions, a torque transmitting element having recessed portions opening in the direction of the axis of the joint and adapted to receive and partially surround the respective bearing members, a pair of integral U-shaped members each having spaced parallel legs adapted to embrace one of the bearing members and to extend beyond said bearing members in a direction opposite to the direction in which said recessed portions open, and a bolt extending through the legs of each U-shaped member and through the portion of the torque transmitting element embraced thereby for drawing the legs against the element, said torque transmitting element and the legs of said U-shaped members having cooperating cam surfaces adapted when said legs are drawn against the element by said bolt to draw said U-shaped member in a direction parallel to the axis of said joint against said bearing members.

12. In a universal joint, a member having a pair of oppositely directed radially extending trunnions, bearing cups on said trunnions, a packing ring around the base of each trunnion against which said cups are adapted to bear to seal the open ends of the cups, a yoke having a pair of spaced arms, said arms having recesses adapted, respectively, to receive and partially surround the bearing cups after the latter have been fitted over the trunnions, and cam means on one of said yoke arms for camming said bearing cups axially into pressure engagement with said packing rings as the cups are moved into said recesses in a direction perpendicular to the axis of the trunnions.

13. A universal joint comprising a member having a pair of oppositely directed trunnions, bearing cups positioned on said trunnions, packing means on said trunnions adjacent the inner edges of said cups, each of said cups having a groove around its periphery adjacent its inner end, resilient retaining rings mounted in said grooves and projecting therefrom, and a yoke having spaced arms, said arms having recesses at their ends adapted to receive said cups by movement of the cups transversely to the axis thereof, and cam means on said arms adapted to engage said rings as the joint is assembled and force the cups inwardly into engagement with the packing means.

14. In a universal joint, a member having a pair of oppositely directed aligned radial trunnions, bearing cups on the respective trunnions, a torque transmitting member having a detachable connection with said cups and adapted to hold said cups against outward movement on said trunnions, and additional means forming a permanent part of the assembly and connected to the cups for holding the cups against outward movement on said trunnions.

15. In a universal joint, a pair of oppositely directed aligned radial trunnions, bearing cups on the respective trunnions, a torque transmitting member having detachable connection with said cups, a locking ring on each of said cups adapted to cooperate with said member to retain the cup against outward movement on its trunnion, and a link connecting said locking rings for holding said cups against outward movement on the trunnions.

16. In a universal joint, a pair of opposed trunnions, a pair of bearing members surrounding the trunnions, a torque transmitting element having recesses adapted to receive said bearing members by relative movement perpendicular to the axis of the trunnions, and means in addition to said element and forming a permanent part of the assembly and connected to said bearing members for holding said bearing members against outward movement on the trunnions.

HANS WOLLNER.